United States Patent [19]

Bisle

[11] 4,292,339

[45] Sep. 29, 1981

[54] STABLE CONCENTRATED LACTIC ACID CONTAINING MIXTURE

[75] Inventor: Hans E. Bisle, Ingelheim am Rhein, Fed. Rep. of Germany

[73] Assignee: Boehringer Ingelheim GmbH, Ingelheim am Rhein, Fed. Rep. of Germany

[21] Appl. No.: 80,057

[22] Filed: Sep. 28, 1979

Related U.S. Application Data

[63] Continuation of Ser. No. 867,483, Jan. 6, 1978, abandoned.

[30] Foreign Application Priority Data

Jan. 7, 1977 [DE] Fed. Rep. of Germany ....... 2700568

[51] Int. Cl.$^3$ .............................................. A23L 1/22
[52] U.S. Cl. ................................................... 426/650
[58] Field of Search ......................................... 426/650

[56] References Cited

U.S. PATENT DOCUMENTS 3,843,812  10/1974  Kuhnert et al. ................ 426/660 X

OTHER PUBLICATIONS

Jacobs Manufacture and Analysis of Carbonated Beverages, 1959, Chem. Publ. Co., Inc.: New York, pp. 72–73, 76–77, 80–81.

Primary Examiner—Joseph M. Golian
Attorney, Agent, or Firm—Hammond & Littell, Weissenberger and Muserlian

[57] ABSTRACT

Stable aqueous solutions of edible organic acids, especially of mixtures of such acids, having a dry substance content of 55% by weight, preferably about 70 to 80% by weight, where about 8 to 20%, and preferably from 12 to 18%, of the acid equivalents present in the solution are neutralized, preponderantly and preferably exclusively with potassium ions.

9 Claims, No Drawings

4,292,339

STABLE CONCENTRATED LACTIC ACID CONTAINING MIXTURE

This is a continuation of Ser. No. 867,483, filed Jan. 6, 1978, now abandoned.

This invention relates to novel stable concentrated solutions of food acidulants.

More particularly, the present invention relates to stable concentrated aqueous solutions of edible organic acids, especially of mixtures of such acids, having a dry substance content of 55% by weight, preferably about 70 to 80% by weight, where about 8 to 20%, and preferably from 12 to 18%, of the acid equivalents present in the solution are neutralized, preponderantly and preferably exclusively with potassium ions.

BACKGROUND OF THE INVENTION

In the preparation of sweets with a sour taste (for example, sour hard candy or fruit drops ), caramels, jelly fruit, marshmallows, jelly beans, chocolate candy fillings and acidulated suckers so-called buffered acids are preferably used in order to obtain on the one hand an agreeable, acidulous taste and, on the other hand, to avoid disagreeable side-effects of an acid additive, such as inversion of the saccharose as well as hydrolytic degradation of gelatin or other polymeric thickeners. On the other hand, such solutions must be as concentrated as possible in order to exclude hydrolytic effects as far as practicable; on the other hand, it is necessary to keep them sufficiently liquid, so that they can be pumped in the course of the modern continuous manufacturing methods. A known product often used for such purposes is the so-called buffered lactic acid, which is an aqueous mixture of lactic acid and sodium lactate having a dry substance content of about 75 to 80% and an average pH-value of 2.7 to 3.2 preferably of 2.9 to 3.0. As a liquid acid with a lesser tendency toward inversion than, for example, tartaric or citric acid, lactic acid comes closer to the requirements to be fulfilled, i.e. that it may be pumped easily and has a low hydrolytic effect. However, its disadvantage is its relatively mild acidulous taste, as well as its higher price.

Therefore, it has already been tried to produce a cheaper buffered lactic acid with a more pronounced and more refreshing taste by adding to it more or less large quantities of solid edible organic acids (for example, tartaric or citric acid). However, when more than 5% of such acids were added, crystalline precipitations resulted which substantially interfered with the processing of the buffered lactic acid, because the concentration of the acid solution was changed in an uncontrolled manner, the pumps were plugged up, crystal agglomerations could form in the candy.

In order to solve this problem, it has also already been proposed to produce concentrated stable solution of solid edible acids by thoroughly admixing the solid edible acids alone, or together with buffered salts with polvalcohols comprising up to 30% of water, heating the mixture quickly to temperatures from 80° to 150° C. and cooling it quickly as well (see German Offenlegungsschrift No. 21 20 846.8-42). The low ester quantities formed thereby were intended to prevent crystallization. But, in practice, this process has also proved not to be fully satisfactory (due to excessively high inversion rates upon use of the product thus obtained). Besides, the product becomes even more expensive due to the required addition of Polyalcohol and the additional process step.

DESCRIPTION OF THE INVENTION

I have discovered that by neutralizing about 8 to about 20%, preferably about 12 up to about 18%, of the acid equivalents present with preponderantly, or preferably even exclusively potassium ions, stable (i.e. protected from crystallizing out) aqueous solutions of (solid) edible acids, such as citric acid, tartaric acid, malic acid or gluconic acid, or mixtures thereof, with a dry substance contact of more than 55% by weight, preferably about 70 to 80% by weight, are obtained. The pH-value of such potassium-buffered, concentrated edible acid solutions is from 2.7 to 3.3 (here, as well as in other passages of the present disclosure, pH-values refer always to measurements in a dilution of 1:10 with water).

Here, the possibility of producing technically interesting mixtures of lactic acid with other edible acids in the indicated range of concentration is of particular value. In this manner, one succeeds in admixing considerable quantities of organic acids, especially citric acid but also tartaric acid, with concentrated lactic acid solutions. For examples, it is readily possible to obtain a stable, concentrated buffered acid solution by means of potassium-buffering to pH 2.7 to 3.3 (preferably 2.9 to 3.0) of the acid present in an aqueous solution of a mixture of lactic acid and citric acid comprising up to 25% citric acid with a dry substance content of about 70 to 80% by weight. This novel buffered acid has the advantage that it possesses a more refreshing acidulous taste than the conventional buffered lactic acids, that its production is cheaper and that, while the increase in the inversion rate remains minimal, other disadvantages such as crystallizing out or difficult pumping are avoided. Of course, its content of edible organic acids (for example, citric acid) may also be higher than 25%, and the dry substance content may be lower than 70% by weight; but this leads to a further increase in the inversion rate.

However, it is of advantage if the sodium is completely replaced by potassium. Besides, it is important that no "over-neutralization" takes place. As shown by Example 4 of the table below, precipitations still occur at least in the preferred range of concentration of about 70 to 80% with a potassium-sodium-ratio of 4:1, so that the sodium content of the buffered solution according to the invention should amount to at most about 10% of the potassium content. Precipitations also result when more than 20% of the acid groups present are neutralized, at least within a range of concentration between 70 and 80% (see Example 11 of the table below).

The buffered acids according to the invention may be produced either by the addition of potassium hydroxide to a concentrated aqueous edible acid solution up to a pH of about 2.7 to 3.3, preferably 2.9 to 3.0, or by admixing the quantity of edible acids required for obtaining a dry substance content of more than 55% with the quantity of their potassium salts required for neutralizing 8 to 20% of the acid equivalents present, and filling up with water to 100%.

The buffered edible acid solutions according to this invention are preferably used in the food industry, such as for the production of candies, jams and jellies, marinated herring or the like. Their use in the beverage industry, such as for the production of soft drinks or beer, is possible as well. Their use in technical areas, such as for tanning of leather, should also be mentioned.

The following process example as well as subsequent Examples 2 to 11 summarized in the table illustrate what has been said above. Examples 5 to 10 illustrate the present invention. Example 7 is an especially preferred embodiment.

EXAMPLE 1 (REFLECTED IN THE TABLE)

An aqueous solution of lactic and citric acid, buffered with sodium salt, contains in 100 gm of finished product

| | |
|---|---|
| 60% of lactic acid 100% corr. to 667 mval | 838 mval of acid |
| 11% of citric acid 100% corr. to 171 mval | |
| 4.6% of NaOH | 116 mval of alkali = 13.8% of acid equivalent |

Dry substace content of total mixture: 73.5%.

Acid solutions of various concentrations were prepared from the composition mentioned above and stored at room temperature as well as in the refrigerator. It was found that even an only 55% solution did not remain sufficiently stable.

| % Dry Substance Content | at Room Temperature | in the Refrigerator (6–8° C.) |
|---|---|---|
| 55 | beginning crystal formation | distinct crystal formation |
| 60 | distinct crystal formation | strong crystal formation |
| 65 | strong crystal formation | strong crystal formation |
| 70 | strong crystal formation | strong crystal formation |
| 73.5 | strong crystal formation | strong crystal formation |
| 76.4 | strong crystal formation | strong crystal formation |

Examples 2 to 11 shown in the following table were prepared in the same manner as in Example 1, i.e. the indicated component values each refer to 100 gm of finished acid mixture:

| Example | | No. 1 (as above) | 2 | 3 | 4 |
|---|---|---|---|---|---|
| Lactic acid 100% | gm | 60 | 61.6 | 61.6 | 61.6 |
| correspond. to | mval | 667 | 684 | 684 | 684 |
| Citric acid | gm | 11 | 12.8 | 12.8 | 12.8 |
| correspond. to | mval | 171 | 200 | 200 | 200 |
| Total acid | mval | 838 | 884 | 884 | 884 |
| KOH | gm | — | 3.4 | 4.8 | 5.9 |
| corrsep. to | mval | — | 60.6 | 85 | 97 |
| NaOH | gm | 4.6 | 2.4 | 1.5 | 1 |
| corresp. to | mval | 116 | 60.6 | 36 | 24 |
| Total alkali | mval | 116 | 121 | 121 | 121 |
| = of acid equivalent | % | 13.7 | 13.7 | 13.7 | 13.7 |
| K:Na | $\frac{mval}{mval}$ | — | 1:1 | 2:1 | 4:1 |
| Dry substance[1] | % | 73.5 | 80.2 | 80.6 | 80.8 |
| Tendency toward crystallization: | | | | | |
| at room temperature | | | cryst. | cryst. | cryst. |
| in refrigerator | | | cryst. | cryst. | cryst. |

| Example | | 5 | 6 | 7 | 8 | 9 | 10 | 11 |
|---|---|---|---|---|---|---|---|---|
| Lactic acid 100% | gm | 61.6 | 61.6 | 60 | 46.2 | 59.5 | 58.2 | 55.7 |
| corresp. to | mval | 684 | 684 | 667 | 513 | 661 | 647 | 619 |
| Citric acid | gm | 12.8 | 13.0 | 11 | 9.6 | 14.9 | 14.5 | 13.9 |
| corresp. to | mval | 200 | 203 | 171 | 150 | 233 | 227 | 218 |
| Total acid | mval | 884 | 887 | 838 | 663 | 994 | 874 | 837 |
| KOH | gm | 6.8 | 8.5 | 6.5 | 5.1 | 6.0 | 7.7 | 11.0 |
| corresp. to | mval | 121 | 152 | 116 | 90 | 107 | 138 | 197 |
| NaOH | gm | — | — | — | — | — | — | — |
| corresp. to | mval | — | — | — | — | — | — | — |
| Total alkali | mval | 121 | 152 | 116 | 90 | 107 | 138 | 197 |
| = acid equivalent | % | 13.7 | 17.1 | 13.8 | 13.7 | 12.0 | 15.8 | 23.6 |
| K:Na | $\frac{mval}{mval}$ | — | | | | | | |
| Dry substance[1] | | 79 | 80.4 | 75.4 | 59.8 | 78.3 | 77.9 | 77.2 |
| Tendency toward crystallization: | | | | | | | | |
| a room temperature | | stable | stable | stable | stable | stable | stable | cryst. |
| in refrigerator | | " | " | " | " | " | " | " |

[1]The water formed during neutralization is taken into consideration here.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. A stable, aqueous solution of a mixture of premixed edible, organic acids consisting essentially of lactic acid and solid edible organic acids, said solution having a dry substance content of over 55% by weight, wherein a mixture of lactic acid and more than 5% and up to 25% by weight, based on the weight of the total mixture, of an organic acid selected from the group consisting of citric acid, tartaric acid, malic acid, and gluconic acid is present in aqueous solution and between about 8 to 20% of the acid equivalents are neutralized by potassium ions or a mixture of ions consisting predominantly of potassium ions.

2. A solution of claim 1, which has a dry substance content of about 70-80% by weight.

3. A solution of claim 1, where between about 12 and 18% of the acid equivalents are neutralized.

4. A solution of claim 1, which has a pH of 2.7 to 3.3.

5. A solution of claim 1, where said mixture is a mixture of lactic acid and citric acid.

6. The solution of claim 1, where at least 90% of the neutralizing cations are potassium ions.

7. A process for the preparation of an aqueous solution of claim 1, which comprises neutralizing between about 8 and 20% of the acid equivalents present in said solution having a dry substance content of more than 55% by weight with potassium hydroxide.

8. The process of claim 7, wherein the solution has a dry substance content of from 70 to 80% by weight.

9. A process of claim 7, wherein the amount of edible organic acid mixture necessary to obtain the dry substance content of over 55% by weight is mixed with an amount of the potassium salts sufficient to neutralize between about 8 to 20% of the acid equivalents present and water is added to 100%.

* * * * *